Feb. 16, 1932. W. J. SHACKELTON Re. 18,354

INDUCTANCE DEVICE AND METHOD FOR MANUFACTURING THE SAME

Original Filed May 21, 1921 2 Sheets-Sheet 1

Inventor:
William J. Shackelton
by W. E. Beatty Atty.

Feb. 16, 1932. W. J. SHACKELTON Re. 18,354

INDUCTANCE DEVICE AND METHOD FOR MANUFACTURING THE SAME

Original Filed May 21, 1921 2 Sheets-Sheet 2

Inventor:
William J. Shackelton,
by W. E. Beatty Atty.

Reissued Feb. 16, 1932

Re. 18,354

UNITED STATES PATENT OFFICE

WILLIAM J. SHACKELTON, OF SCOTCH PLAINS, NEW JERSEY, ASSIGNOR, BY MESNE ASSIGNMENTS, TO AMERICAN TELEPHONE & TELEGRAPH COMPANY, A CORPORATION OF NEW YORK

INDUCTANCE DEVICE AND METHOD FOR MANUFACTURING THE SAME

Original No. 1,624,630, dated April 12, 1927, Serial No. 471,371, filed May 21, 1921. Application for reissue filed February 20, 1929. Serial No. 341,550.

This invention relates to inductance devices and their manufacturing methods of the type known in the art as retard coils, loading coils, transformers, and the like.

Inductance coils hitherto employed have been usually constructed by winding the wire conductor around a frame of rectangular or toroidal form for example, so that the windings substantially surround the magnetic core material.

It is an object of this invention to provide a simpler, more compact and more easily manufactured inductance device than can be obtained by the above method and this object is obtained by reversing the usual space relation of the windings and the magnetic material in such a manner that the magnetic material entirely surrounds the windings. The complete imbedding of the windings in the magnetic material is of especial importance in case the coils are to be employed as loading coils, for example, in a telephone system, since this novel structure completely screens each coil from all external disturbances from foreign potentials in associated apparatus. In the preferred embodiment of this invention, this is accomplished by winding the wire conductor into a coil of the desired diameter and forming the magnetic material into two blocks, each containing a circular groove in one face so that the coiled wire will snugly fit into the grooves when the two blocks are placed with their two grooved faces against each other. Such a structure is particularly advantageous for use as a loading coil for a submarine cable, for example, where only a limited amount of space in a diametrical direction is available. The magnetic material employed should have as high permeability as possible, consistent with low magnetic losses, and for that reason the iron dust magnetic material described in the Speed, U. S. Patent No. 1,274,952 is preferably employed, not only because of its suitability from a magnetic standpoint, but also on account of the ease with which it may be moulded into any desired shape. Holes in the magnetic material should, of course, be provided for the leading in conductors of the coil.

Figure 1:
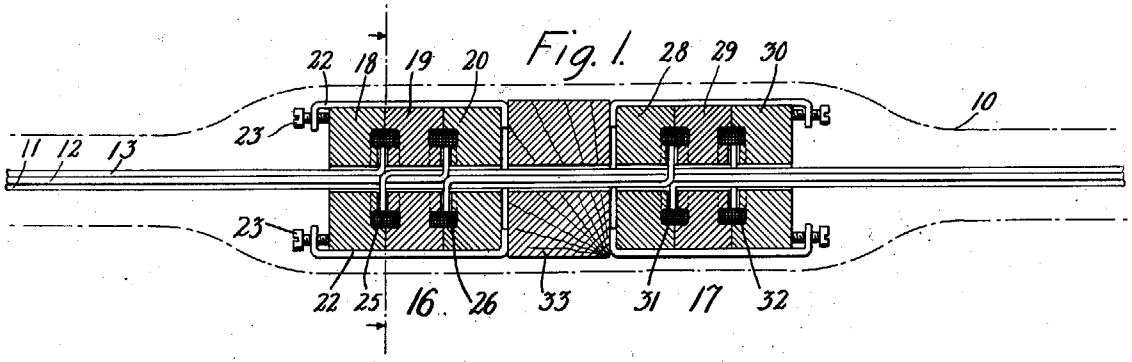
Figure 2:
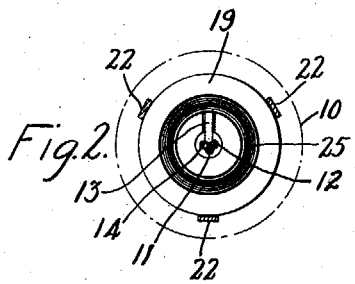
Figure 3:
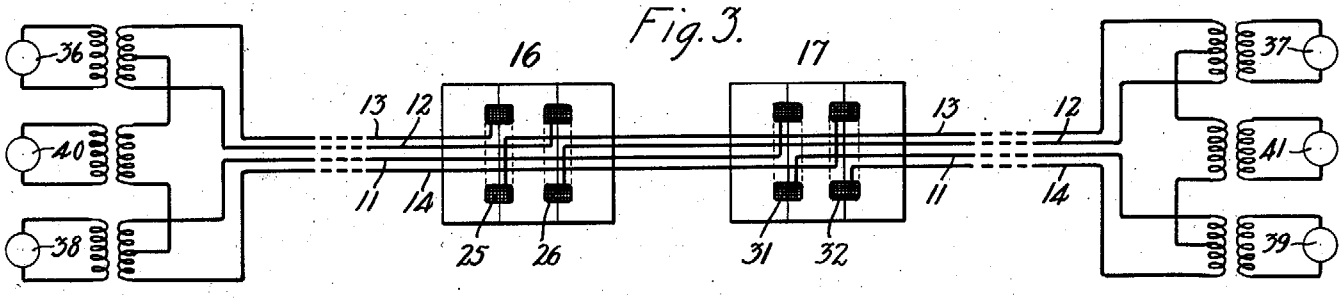
Figure 4:
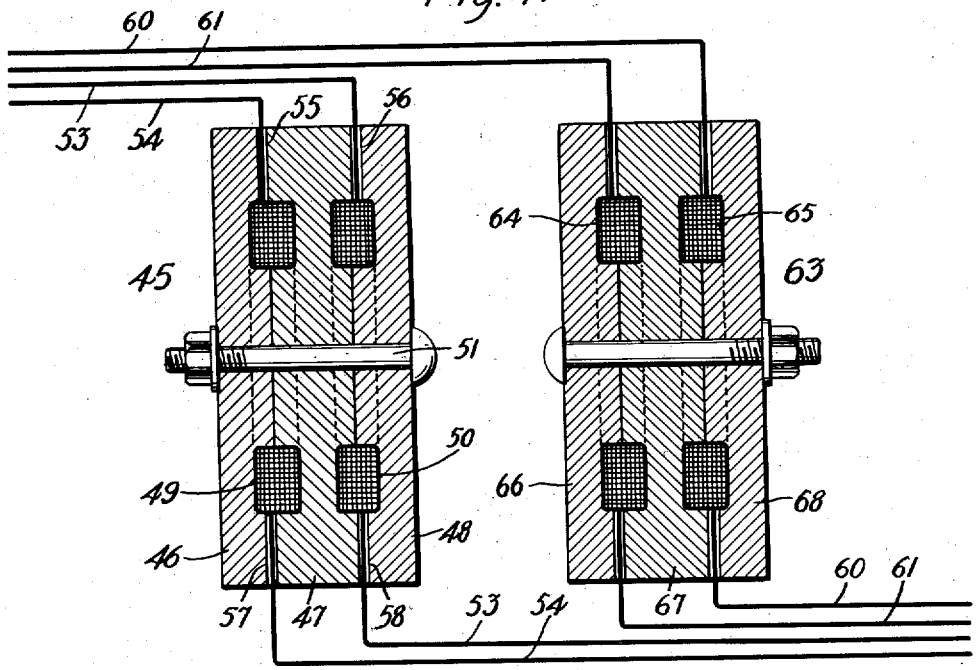
Figure 5:
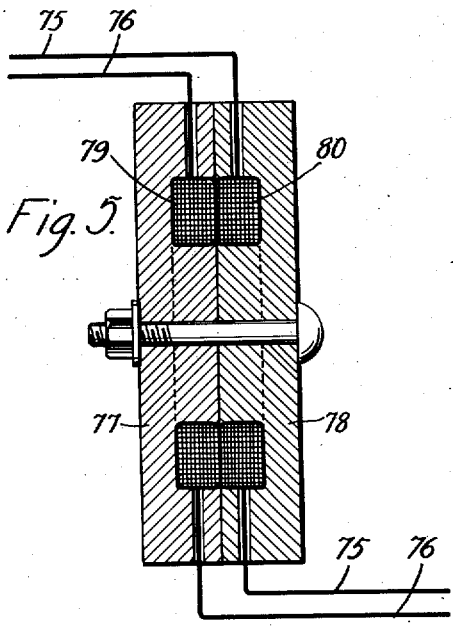
Figure 6:
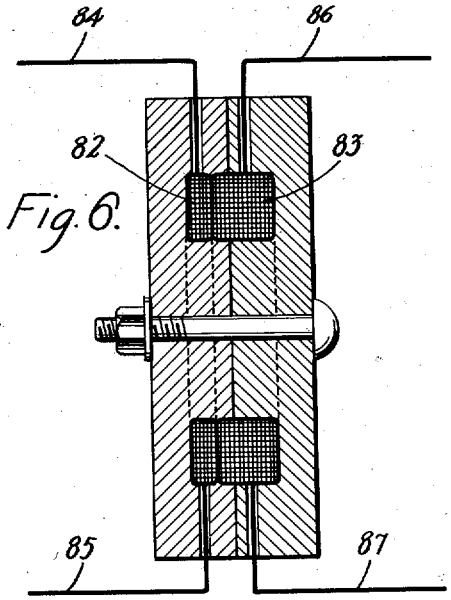

This invention will be better understood by reference to the following detailed description taken in connection with the accompanying drawings, in which Fig. 1 illustrates the inductance device of this invention employed as a loading coil for a submarine cable; Fig. 2 is a cross section of a portion of Fig. 1; Fig. 3 is a schematic drawing of the circuit connections for the submarie cable of Fig. 1; Fig. 4 represents a modified form of this invention particularly adapted for loading telephone lines; Fig. 5 represents this invention employed as an ordinary retard coil, and Fig. 6 represents this invention employed as a two-winding step-up transformer.

The submarine cable illustrated in Fig. 1, comprises a suitable armor or other covering 10, surrounding four signaling conductors 11, 12, 13 and a fourth conductor opposite conductor 12, but not shown in Fig. 1, although shown in Fig. 3. In accordance with this invention these four signaling conductors are loaded according to the Pupin system of loading by means of two inductance devices 16 and 17. Inductance device 16 comprises three cylindrical blocks 18, 19 and 20 which are held together by any suitable clamping means such as members 22 in one end of which are provided tightening screws 23. The two adjacent faces of blocks 18 and 19 contain circular grooves in which a coil of wire 25 is adapted to be placed. A similar inductance coil 26 is located in corresponding grooves in the adjacent faces of blocks 19 and 20. The inductance device 17 is similar to inductance device 16 and comprises three cylindrical blocks of magnetic material 28, 29 and 30 in which are imbedded two coils of wire 31 and 32. The two inductance devices 16 and 17 are separated from each other a suitable distance by a block 33 of insulating material, such as wood.

As shown more clearly in Fig. 3, a coil 31 is connected in series with conductor 11 of the submarine cable, coil 32 in series with conductor 14, coil 26 in series with conductor 12, and coil 25 in series with conductor 13. As shown in Fig. 1 the four conductors of the cable pass through apertures in the blocks 18, 19, 20, 23, 28, 29 and 30, centrally located therein, in a direction parallel to the length of the cable. Such an arrangement has obviously a particular advantage in submarine cables since the signaling conductors thereof are deviated from their natural course only in short connections from the center of the loading units to the coils of wire. As shown in Fig. 1, each signaling conductor of the cable is connected in series with one of the coils of the wire by a leading-out conductor and a leading-in conductor located in small apertures passing from the centrally located opening in the blocks of magnetic material up to the grooves in the blocks wherein the coils of wire are found.

If desired, the two inductance devices 16 and 17 may also be employed for loading the phantom circuit as well as the two physical circuits formed from the four conductors 11 to 14 inclusive. This loading of the phantom circuit by these two inductance devices is made possible by the fact that since the two coils of each pair aid for side circuit currents, it is obvious that for phantom circuit currents there will be opposing fluxes due to coils 25 and 26 and also opposing fluxes due to coils 31 and 32. The amount of flux interlinkage due to these effects will depend upon the distance between the two coils of each loading unit. The greater the distance between the two coils, the greater will be the resultant phantom flux and hence, the greater will be the ratio of phantom to side circuit loading. In Fig. 3, signaling devices 36 and 37 may be employed for signaling over the physical circuit comprising conductors 12 and 13, while the signaling devices 38 and 39 may be employed for the transmission of signals over conductors 11 and 14 and devices 40 and 41 may, by well known connections, be employed in signaling over the phantom circuit derived from the four signaling conductors of the cable. It is obvious that each of the pairs of coils of wire 25 and 26, 31 and 32 should be adjusted to have such an inductance value as to load the signaling conductors of the cable to the proper extent according to the Pupin system. Inasmuch as loading systems are now well known in the art, it is not believed necessary in this specification, to recite a specific example of what values these inductances should have for the loading of a submarine cable of a given type.

In order to make each of the inductance devices 16 and 17 as compact as possible for a desired value inductance, the magnetic material employed should be of as high permeability as possible as is consistent with low magnetic losses. For example, they are preferably composed of iron dust core material of the type described in the U. S. Patent Nos. 1,274,952 to Speed, 1,286,965 to Elmen and 1,292,206 to Woodruff, which material is not only suitable from a magnetic standpoint, but also is capable of being moulded into any desired shape. Such a material therefore can be readily formed to provide the necessary grooves and apertures required for such an inductance device as that described above.

Fig. 2 is a cross section of inductance device 16, taken along the line marked by the arrows and serves to illustrate more clearly the space relation of the various parts of the inductance device described in detail above.

Fig. 4 illustrates a modified type of the inductance device of this invention which may be employed, for example in loading duplex telephone lines. The inductance device 45 of Fig. 4, comprises three blocks of magnetic material 46, 47 and 48 which are grooved in a similar manner as the blocks of Fig. 1 to provide for the imbedding therein of the two inductance coils 49 and 50. After the inductance coils have been imbedded in the three blocks, they may be assembled and held in position with respect to each other by a bolt 51, for example, passing through an opening in the three blocks parallel to the axis of the two inductance coils. The two telephone line conductors 53 and 54 of the one physical circuit may be connected to the inductance coils 49 and 50 by lead-in wires passing through small apertures 55 and 56 in the blocks of magnetic material, the leading-out conductors passing through corresponding apertures 57 and 58 on the opposite side of the block. The two conductors 60 and 61 of the second physical circuit may be similarly loaded by an inductance device 63 comprising inductance coils 64 and 65 imbedded in three blocks 66, 67 and 68 of appropriate magnetic material.

Inasmuch as the question of space in a diametrical direction is not so vital in loading a telephone line, as in loading a submarine cable, inductance devices 45 and 63 are shown to have a much greater dimension in a direction at right angles to the axis of the coils than they have in a direction parallel to this axis. This form is advantageous for the reason that it facilitates assembly of a large number of coils in one case. In comparing the inductance devices of Fig. 4 with those of Fig. 1, it should be noted that in Fig. 1, the dimensions of each of the devices 16 and 17 in a direction parallel to the axis of the coils is greater than in the direction at right angles thereto, since such a form decreases to a considerable degree the over all circumference of the submarine cable at a loading point as compared to a submarine cable containing inductance devices of the form shown in Fig. 4 or of the type having a core as shown, for example, in the Speed patent above mentioned.

From the above description it will be readily understood that it is frequently advantageous to employ the inductance device of this invention not only as a loading coil but also for other purposes, such as retard coils, transformers, and the like.

Fig. 5, for example, illustrates an inductance device employed as a retard coil for an electric circuit comprising conductors 75 and 76. The inductance device disclosed therein is composed of only two blocks 77 and 78 of magnetic material, each block being grooved to provide a housing for one of the two coils 79 and 80 so that when the two blocks are clamped together the two coils 79 and 80 will be so positioned that there will be a maximum of interlinkage of the fluxes of the two coils. The inductance device shown in Fig. 6 is similar to that shown in Fig. 5 except that one of the coils 83, for example, is shown to consist of a greater number of turns of wire than its associated coil 82. This device therefore may be readily employed as a step-up transformer in an electric circuit, conductors 84 and 85 being connected to the primary winding 82 and conductors 86 and 87 being connected to the secondary winding 83. Inasmuch as the two coils 82 and 83 are positioned side by side in the grooves of the magnetic material, it follows that there is a maximum of interlinkage of the fluxes of the primary and the secondary windings. This type of transformer also possesses an advantage over the type of transformer in which the core material is surrounded by the coiled wire for the reason that the transformer of Fig. 6 has practically no stray lines of force which might become troublesome in causing cross talk between adjacent apparatus located in different circuits.

What is claimed is:

1. A block of iron dust core material, and a coil of wire imbedded in said block.

2. An inductance device comprising finely divided magnetic material, and a coil of wire substantially entirely imbedded in said material.

3. In a signaling system, a submarine cable, an inductance device for loading said cable comprising a plurality of inductance coils having their axes parallel to the length of said cable, and masses of iron dust material substantially entirely imbedding said coils.

4. A signaling system comprising a plurality of signaling conductors, a loading device for said conductors comprising a plurality of coils of wire, said device having an opening therethrough located parallel to the axes of said coils and surrounded by said coils, said signaling conductors passing through said opening.

5. A signaling system comprising a submarine cable, a loading device for said cable comprising a plurality of inductance coils surrounded by magnetic material, said magnetic material having an opening therethrough parallel to the axes of said coils and surrounded by said coils, the conductors of said cable passing through said opening.

6. A signaling system comprising a plurality of signaling conductors, means for loading two physical circuits and a derived phantom circuit formed from a plurality of said conductors, said means comprising a plurality of inductance coils imbedded in magnetic material of a uniform composition, said coils being located in said magnetic material in such a position with respect to each other that an interlinkage of the fluxes of a plurality of said coils takes place.

7. An inductance device comprising a cylindrical coil of wire and a core completely surrounding said coil, at least that portion of the core within the coil being composed of comminuted magnetic material.

8. An inductance device for signaling circuits comprising a coil of wire, a core of magnetic material in which the eddy current losses are negligible completely surrounding the coil, at least that portion of the core within the coil being composed of iron dust core material.

9. A loading coil for signaling circuits comprising a coil of wire, and a closed magnetic core comprising finely divided magnetic material completely embedding said coil and insulated therefrom.

10. An inductance device comprising a coiled conductor, and an envelope of comminuted magnetic material substantially enclosing said coiled conductor and insulated therefrom.

11. A device having a substantially closed magnetic circuit comprising a central core and a surrounding magnetic structure, and energizing turns about said core and surrounded by said surrounding magnetic structure, the magnetic circuit structure being made in a plurality of parts for easy assembling and a substantial part thereof being made up of a mixture of iron dust and a binder.

12. A device having a substantially closed magnetic circuit comprising a central core and a surrounding magnetic structure, and energizing turns about said core and surrounded by said surrounding magnetic structure, the said surrounding structure being made in a plurality of separable parts for ease in assembling and a substantial part thereof being made up of a mixture of iron dust and a binder.

13. A device having a substantially closed magnetic circuit comprising a central core and a surrounding magnetic structure, and energizing turns about said core and surrounded by said surrounding magnetic structure, the said surrounding structure being made in a plurality of separable parts for ease in assembling and a substantial part thereof being made up of a mixture of iron dust and a binder, and means for locking said parts together.

14. A device comprising two cup shaped members facing one another and forming part of the magnetic circuit of the device and a magnetic core arranged centrally of said members, said cup shaped members being composed of a mixture of iron dust and a suitable binder.

15. A device having a core of magnetic material, a winding surrounding the same and an enclosing structure of magnetic material entirely surrounding said core and winding and forming part of the magnetic circuit of the transformer, a substantial part of the magnetic circuit being formed of a mixture of iron dust and a binder.

16. A device having a substantially closed magnetic circuit comprising a central core and a surrounding magnetic structure, and energizing turns about said core and surrounded by said surrounding magnetic structure, a substantial part of said magnetic circuit being made up of a mixture of iron dust and a binder.

17. A device having a substantially closed magnetic circuit comprising a central core and a surrounding magnetic structure, and energizing turns about said core and surrounded by said surrounding magnetic structure, said surrounding magnetic structure being made up of a mixture of iron dust and a binder.

In witness whereof I hereunto subscribe my name this 18th day of February, 1929.

WILLIAM J. SHACKELTON.